(12) United States Patent
Sarmiento Penuela et al.

(10) Patent No.: US 9,581,089 B2
(45) Date of Patent: Feb. 28, 2017

(54) GAS DOSAGE CONTROL FOR GAS ENGINE

(71) Applicant: General Electric Company, Schenectady, NY (US)

(72) Inventors: Oscar Eduardo Sarmiento Penuela, Nürnberg (DE); Raphael Rupert Burgmair, Munich (DE); Johannes Huber, Brandenberg (AT); Medy Satria, München (DE); Rosa Castane Selga, Ismaning (DE); Prashant Srinivasan, Karnataka (IN)

(73) Assignee: General Electric Company, Schenectady, NY (US)

( * ) Notice: Subject to any disclaimer, the term of this patent is extended or adjusted under 35 U.S.C. 154(b) by 776 days.

(21) Appl. No.: 13/891,807

(22) Filed: May 10, 2013

(65) Prior Publication Data

US 2014/0331685 A1 Nov. 13, 2014

(51) Int. Cl.
*F02C 9/50* (2006.01)
*F02C 9/52* (2006.01)
*F02C 9/18* (2006.01)

(52) U.S. Cl.
CPC ............. *F02C 9/52* (2013.01); *F02C 9/18* (2013.01); *F02C 9/50* (2013.01); *F05D 2260/606* (2013.01); *F05D 2270/301* (2013.01); *F05D 2270/303* (2013.01); *F05D 2270/80* (2013.01)

(58) Field of Classification Search
CPC ..................... F02C 9/18; F02C 9/50
See application file for complete search history.

(56) References Cited

U.S. PATENT DOCUMENTS

| 4,163,365 A | 8/1979 | Frutschi |
| 6,442,942 B1 | 9/2002 | Kopko |
| 6,932,052 B1 | 8/2005 | Fulton |
| 7,287,525 B2 | 10/2007 | Taglialatela-Scafati et al. |
| 7,565,892 B1 | 7/2009 | Cleary et al. |
| 2007/0079614 A1* | 4/2007 | Barbe ..................... F02B 37/12 60/605.2 |
| 2010/0139282 A1 | 6/2010 | Prabhu |

(Continued)

FOREIGN PATENT DOCUMENTS

| CN | 1355869 A | 6/2002 |
| EP | 1206634 A1 | 5/2002 |

(Continued)

OTHER PUBLICATIONS

Unofficial English Translation of Chinese Office Action issued in connection with corresponding CN Application No. 201410194273.4 on Jan. 29, 2016.

(Continued)

*Primary Examiner* — Phutthiwat Wongwian
*Assistant Examiner* — Marc Amar
(74) *Attorney, Agent, or Firm* — Fletcher Yoder, P.C.

(57) ABSTRACT

A gas engine assembly includes a compressor, a combustion system, a bypass line and a control system. The control system is configured to control gas supply parameters based on a transportation delay value. The transportation delay value corresponds to a delay between a time when a gas supply control mechanism is adjusted and a time that gas having a corresponding adjustment of a gas characteristic is received at a predetermined point downstream from the gas supply control mechanism.

19 Claims, 5 Drawing Sheets

(56) References Cited

U.S. PATENT DOCUMENTS

2012/0095668 A1    4/2012   Landsmann et al.

FOREIGN PATENT DOCUMENTS

| EP | 2112572 A2 * | 10/2009 | ............ F23N 1/002 |
|----|--------------|---------|------------------------|
| JP | S5934424 A   | 2/1984  |                        |
| JP | 2000161083 A | 6/2000  |                        |

OTHER PUBLICATIONS

Unofficial English translation of Korean Office Action from corresponding KR Application No. 2014-0051462 dated May 11, 2015.
European Search Report issued in connection with corresponding EP Application No. 14167312.9 dated Dec. 11, 2014.

* cited by examiner

GAS DOSAGE CONTROL FOR GAS ENGINE

BACKGROUND OF THE INVENTION

The subject matter disclosed herein relates to gas dosage control of a gas engine, and in particular, to determining a transportation delay in a gas supply line of a turbocharger gas engine and controlling gas supply parameters based on the transportation delay.

Gas turbines of gas engines generate power by providing a fluid, such as gas, air, or a gas/air mixture, into a compressor, heating the fluid with a combustor, and driving the heated fluid through a turbine stage. The turbine stage includes blades or buckets fixed to a shaft and configured to rotate the shaft as the heated fluid is directed to the blades or buckets, turning the shaft to generate power. In a turbocharger turbine, the rotation of the shaft may be used to rotate blades in the compressor to force the induction of air into the compressor.

A supply of gas to the compressor and the combustion system may be controlled by a gas dosage valve, and a mixture of air and the gas supplied to the compressor and combustion system may be controlled by a gas mixer. However, when transmitting control signals to a gas dosage valve or gas mixer to flow a desired amount of gas, or a desired gas/air mix, to the combustor, a delay exists between a time that a gas supply control mechanism, such as a gas supply valve, is adjusted and a time that a corresponding change in a gas characteristic is received at a point downstream from the gas supply control mechanism.

BRIEF DESCRIPTION OF THE INVENTION

According to one aspect of the invention, a gas engine assembly includes a compressor configured to receive a gas from a first gas supply line and to compress the gas. A combustion system receives the gas from the compressor via a second gas supply line and to combust the gas and a fuel. A bypass line has one end connected to the first gas supply line and an opposing end connected to the second gas supply line to divert a portion of the gas less than all of the gas from one of the first and second gas supply lines to the other of the first and second gas supply lines. A control system controls gas supply parameters based on a transportation delay, where the transportation delay corresponds to a delay between a time when a gas supply mechanism is adjusted and a time that a corresponding change in a characteristic of the gas is detected at a predetermined point downstream from the gas supply mechanism.

According to another aspect of the invention, a transportation delay calculation module receives a measurement from at least one sensor along a gas supply path between a gas supply source and a combustion system and calculates a transportation delay value corresponding to a delay between a time that a gas supply control mechanism is adjusted and a time that gas having a corresponding adjustment of a gas characteristic arrives at the combustion system. A gas supply mechanism command module generates a gas supply control signal to control the gas supply control mechanism based on the transportation delay value.

According to yet another aspect of the invention, a method of controlling operation of a gas engine assembly includes obtaining at least one set of measurements from at least one sensor along a gas supply path, where the gas supply path is configured to supply the gas from a gas supply source to a compressor and from the compressor to a combustion system of a gas turbine. The gas engine assembly includes a bypass line having one end connected along the gas supply path between the gas supply source and the compressor and an opposite end connected along the gas supply path between the compressor and the combustion system. The method includes calculating a transportation delay value corresponding to a delay between a time that a gas supply control mechanism is adjusted and a time that gas having a corresponding adjustment of a gas characteristic is received at a predetermined point downstream from the gas supply control mechanism. The method includes generating a gas supply control signal to control the gas supply control mechanism based on the transportation delay value.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In gas engine systems, a delay exists between a time that a gas or air supply mechanism is adjusted to time that a corresponding change in a gas flow to a combustion system is received at the combustion system. The delays may result in inefficiencies or errors in the gas/air supply system. Embodiments of the present invention relate to controlling a gas/air mixture based on a determined transportation delay.

Figure 1:
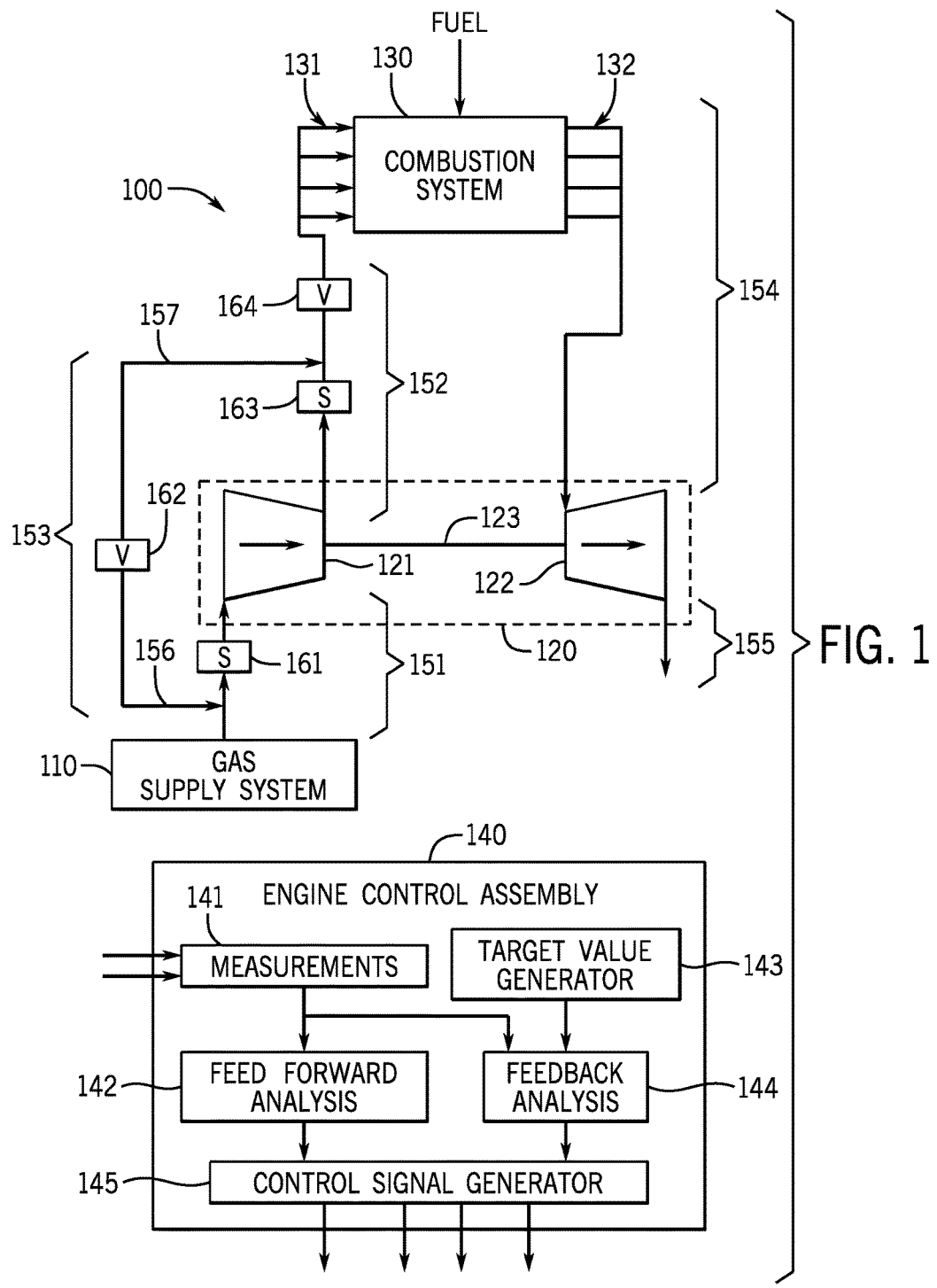
FIG. 1 illustrates a gas engine assembly according to an embodiment of the invention.

FIG. 1 illustrates a gas engine assembly 100 according to an embodiment of the invention. The assembly 100 includes a gas supply system 110, a turbine structure 120, a combustion system 130 and an engine control assembly 140. In operation, the gas supply system supplies gas along a first gas supply line 151 to the turbine structure 120. The turbine structure 120 includes a compressor 121, a turbine stage 122 and a shaft 123 connecting blades of the compressor 121 with buckets of the turbine stage 122. During operation, the turbine structure 120 may operate as a turbocharger by forcing induction of the gas into the compressor 121 by driving the blades of the compressor 121 with the shaft 123.

The gas flows from the compressor 121 to the combustion system 130 via a second gas supply line 152. The gas supply line 152 may be split from one flow path into multiple flow paths at the intake manifold 131 to direct the gas to multiple combustors, for example. The gas may be combusted and heated in the combustion system and may be output via multiple flow paths from the exhaust manifold 132 corresponding to multiple combustors. The gas is directed from the combustion system 130 to the turbine stage 122 via a third gas supply line 154. The gas is emitted from the turbine stage 122 via an exhaust path 155, where the gas may be released into the air, captured for storage, re-used for additional heating or cooling operations, or used for any other purpose.

In embodiments of the present invention, a bypass line 153 has a first end 156 connected upstream of the compressor 121 to the first gas supply line 151 and a second end 157 connected downstream of the compressor 121 to the second gas supply line 152. Depending upon the pressure ratio between the pressure in the first gas supply line 151 and the second gas supply line 152, the gas may flow either from the first and 156 to the second end 157, or from the second end 157 to the first end 156. For example, when the engine assembly 100 is configured to operate as a turbocharger, the gas may flow along the bypass line 153 from the end 156 connected to the first gas supply line 151 to the second end 157 connected to the second gas supply line 152, bypassing the compressor 121. The gas that is transmitted via the bypass line 153 is only a portion of the gas from the first gas supply line 151, and the remainder of the gas flowing through the first gas supply line 151 flows to the compressor 121.

Since the bypass line 153 diverts a portion of the gas from the first or second gas supply lines 151 or 152, controlling a gas supply mechanism, such as a valve, in the gas supply system 110, or along the first or second gas supply lines 151 or 152, or along the bypass line 153 results in non-linear response in the flow of gas between the gas supply system 110 and the combustion system 130. In other words, adjusting a valve to increase gas flow by a predetermined amount may not result in a proportional or linear change in gas characteristics, such as gas concentration, at the intake manifold 131 of the combustion system 130.

In embodiments of the present invention, the gas may be pure gas or gas mixture, or a combination of atmospheric air (also referred to in the specification as "air") and another gas, such as oxygen, nitrogen or any other gas or mixture of gases that are not atmospheric air. In other words, the term "gas" in the specification may refer to a pure gas or mixture of non-air gases or to a gas/air mixture according to the context in which the term is used. For example, the gas that flows through the first gas supply line 151 and the second gas supply line 152 may be a gas/air mixture, while a gas supplied from a gas supply, such as the gas supply 111 of FIG. 2, may be a pure gas or mixture of gases that are not air.

The gas engine assembly 100 includes gas supply control mechanisms 162 and 164, also referred to in the specification as valves (V) 162 and 164, located along the bypass line 153 and the second gas supply line 152. These are provided as examples of locations of valves for controlling gas flow in the assembly 100, and embodiments of the invention encompass additional valves, valves located in different locations within the assembly 100, and any other type of gas supply control mechanisms other than valves.

The gas engine assembly 100 also includes sensors (S) 161 and 163. The sensor 161 may be located along the first gas supply line 151 and the sensor 163 may be located along the second gas supply line 152. While the sensors 161 and 163 are provided by way of example, embodiments of the invention encompass any arrangement of sensors within the assembly 100, such as along the bypass line 153, in the gas supply system 110, in the turbine structure 120, along one or more of the multiple flow paths 131 or 132, along the third gas supply line 154 or along the exhaust flow path 155. The sensors 161 and 163 may include any type of sensor, such as pressure sensors, temperature sensors, flow sensors, or any other type of sensor.

While the gas flow paths have been described as first, second and third gas supply lines 151, 152 and 154, a bypass line 153 and an exhaust path 155, embodiments of the present invention are not limited to lines or conduits, but embodiments encompass any structure that may confine and direct the flow of a gas. Example structures include lines, tubes, hoses, and cavities bored into or formed in a structure, such as the turbine structure 120, cavities formed by framing structures, such as framing components or the turbine structure 120 or any other structures. The first, second and third gas supply lines 151, 152 and 154, a bypass line 153 and an exhaust path 155 may include any shape and may have different portions that have different shapes, such as tubular, substantially flat, straight, curved, narrow, decreasing in cross-sectional area, increasing in cross-sectional area, or any other shape according to design considerations of the assembly 100.

The gas engine assembly 100 further includes the engine control assembly 140 configured to control a supply of gas from the gas supply system 110 to the combustion system 130. In one embodiment, the engine control assembly 140 includes circuitry, such as a processing circuit, memory, programmable logic, passive electrical components and other circuitry to receive, store, analyze and transmit data. The engine control assembly 140 receives and stores measurements 141 from the sensors 161 and 163. The measurements 142 are used in a feed forward analysis unit 142 to measure a transportation delay of the gas along the first and second gas supply lines 151 and 152, while taking into account a diversion of a portion of the gas flow through the bypass line 153. Accordingly, in one embodiment, the feed forward analysis unit 142 applies a non-linear algorithm to generate a feed-forward compensation signal.

In one embodiment, the feed forward analysis unit 142 includes one or both of software and hardware configured to represent an algorithm that receives as inputs the measured sensor data and generates as outputs one or more values corresponding to a transportation delay of the gas engine assembly 100. The algorithm describes changes of gas concentration in manifolds along the gas supply path (such as through the gas supply system 110, along the first gas supply line 151, through the compressor 121, along the second gas supply line 152 and along the bypass line 153) as a function of engine states. In some embodiments, engine states correspond to combustion levels of the combustion system 130, rotation speed or torque levels of the turbine structure 120, fuel consumption levels, gas flow levels, exhaust levels or any other engine states.

In one embodiment, the algorithm is a non-linear algorithm expressing the transportation delay between a gas supply mechanism and the intake manifold 131. The algorithm takes into account the diverting of a portion of gas from the first and second gas supply lines 151 and 152 through the bypass line 153.

The engine control assembly 140 also includes a target value generator 143. The target value corresponds to an engine state, such as a value of a gas parameter. In one embodiment, the target value corresponds to a concentration of gas that is desired at the intake manifold 131 of the combustion system 130. In one embodiment, the target value is calculated based on reference data, such as data input from a user, model data for controlling the gas turbine, or any other reference data. For example, the gas engine assembly 100 may be controlled according to a model that calculates a target value to achieve a desired power output level, such as a rotation speed of the shaft 123, a torque level of the shaft 122, pre-defined exhaust output levels, predetermined fuel consumption levels, predetermined gas consumption levels, any combination of these levels, or any other criteria corresponding to power output.

The target value is provided to the feedback analysis unit 144, which compares the target value to the measurements 141 to generate an error value. The feed forward analysis value and the error value are provided to a control signal generator 145 to generate control signals to control operation of the gas engine assembly 100. Examples of control signals include control signals to control the valves 162 and 164, to control a gas supply from the gas supply system 110, to control a fuel supplied to the combustion system 130 or to control any other variable parameter of the gas engine assembly 100.

In one embodiment, the feed forward analysis unit 142 calculates the transportation delay based only on one or both of pressure data and temperature data from pressure and temperature sensors. In another embodiment, the feed forward analysis unit 142 calculates the transportation delay based only on one or more of pressure data from a pressure sensor, temperature data from a temperature sensor, rotation speed data of the compressor 121, shaft 123 or turbine stage 122, and mass flow of gas through a gas supply mechanism. In other words, while the gas engine assembly 100 may include any number and type of sensors, the feed forward analysis unit 142 may utilize each of the various types of sensors to calculate the transportation delay, or the feed forward analysis unit 142 may calculate the transportation delay with only a subset of the sensors, such as only pressure sensors, temperature sensors and rotation speed sensors of the turbine structure 120.

In one embodiment, the gas engine assembly 100 does not include one or both of a lambda sensor and an oxygen concentration sensor. In such an embodiment, the feed forward analysis unit 142 calculates the transportation delay for the system to adjust gas supply control signals 145 based on other sensors along the gas supply path, such as pressure sensors, temperature sensors, rotation speed sensors and gas flow sensors. In another embodiment, the gas engine assembly 100 includes one or both of a lambda sensor and an oxygen concentration sensor. In such an embodiment, the feed forward analysis unit 142 may calculate the transportation delay to provide system redundancy. In such an embodiment, the transportation delay calculated by the feed forward analysis unit 142 is compared with data generated by one or both of the lambda sensor and the oxygen concentration sensor to detect sensor failures, software failures, or other anomalies in the gas engine assembly 100.

FIG. 1. illustrates a configuration of an engine assembly 100 having gas injected from a gas supply system 110 upstream of the first end 156 of the bypass line 153. However, embodiments of the invention encompass gas injection at any point along the gas and air supply lines 151 and 152. For example, in one embodiment, first end 156 of the bypass line 153 is located upstream of the gas supply system 110. In such an embodiment, air may be supplied to the gas supply system 110 and the air may flow across the opening of the bypass line 153 at the first end 156 of the bypass line 153. Gas may be mixed into the air stream by the gas supply system 110, as discussed above.

In yet another embodiment, the gas supply system 110 may inject the gas into the supply line 152 downstream from the second end 167 of the bypass line 153 prior to the valve 164, which may be referred to as a throttle valve 164. In other words, embodiments of the invention encompass any configuration of introducing gas from the gas supply system 110 into the first and second supply lines 151 and 152.

Figure 2:
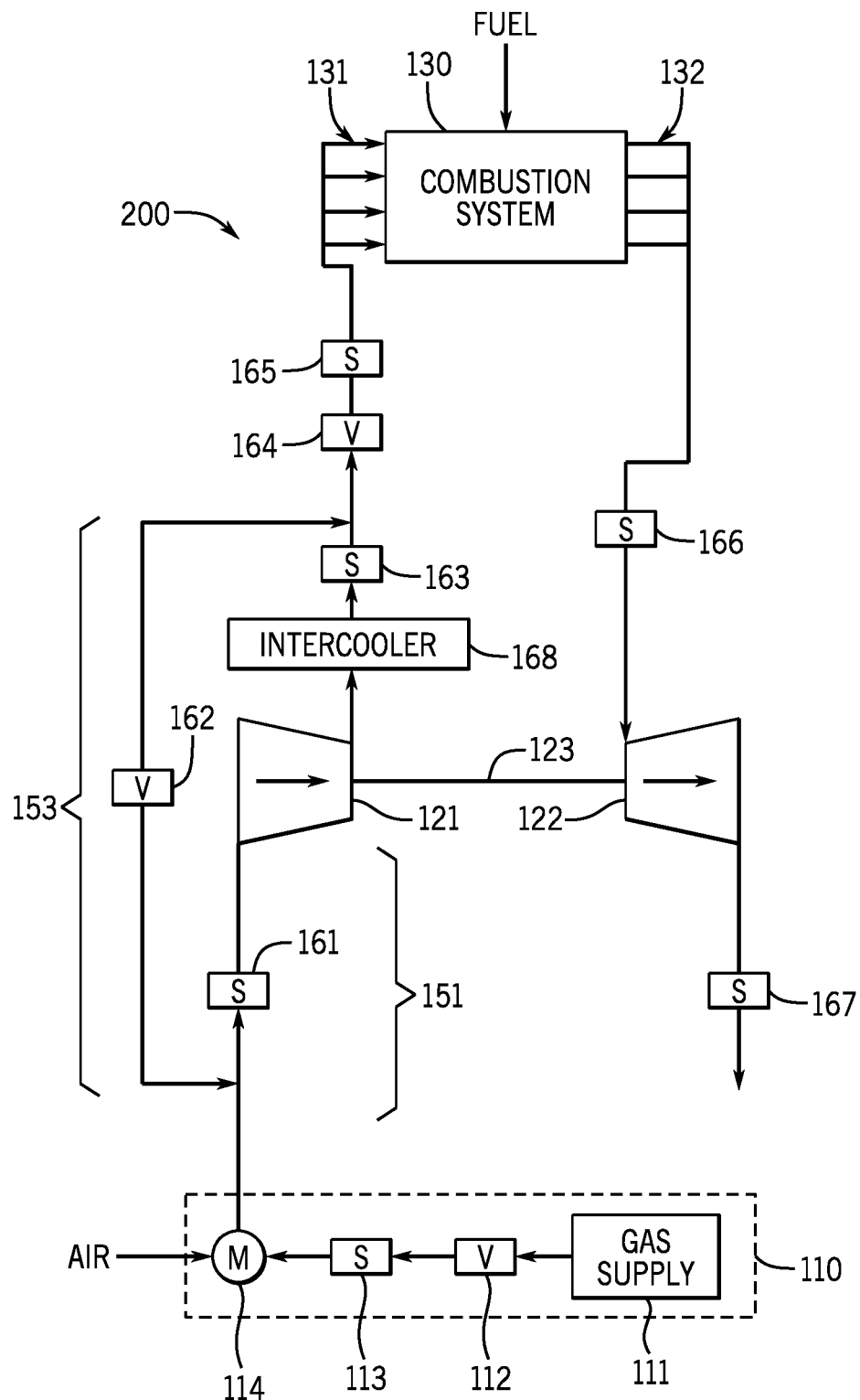
FIG. 2 illustrates a gas engine assembly according to another embodiment of the invention.

FIG. 2 illustrates a gas engine assembly 200 according to another embodiment of the invention. Elements of the gas engine assembly 200 that are the same as in FIG. 1 have been described previously and are not described again with respect to FIG. 2. As illustrated in FIG. 2, in one embodiment the gas supply system 110 includes a gas supply 111, a gas dosage valve (V) 112 a sensor (S) 113 and an air/gas mixer (M) 114. The gas supply 111 may be a storage container, gas filtration system or other system or pathway to provide a non-air gas to the gas engine assembly 200.

The gas dosage valve 112 controls the flow of the non-air gas into the gas engine assembly 200, and the sensor 113 detects a characteristic of the non-air gas, such as a pressure, temperature, concentration, flow rate, or any other characteristic. The mixer 114 controls an amount of air added to the non-air gas to be supplied to the combustion system 130. The resulting gas (which may be a non-air gas, or a mixture of air and the non-air gas, or a gas/air mixture) is supplied to the compressor 121, and a portion may be diverted through the bypass line 153, as discussed above with respect to FIG. 1.

In one embodiment, the gas from the compressor 121 is supplied to an intercooler 168 to control a temperature of the gas. The valve 164, which may be referred to as a throttle valve 164, controls the flow of the gas into the combustion system 130. A sensor 165 is located downstream from the throttle valve 164 and detects characteristics of the gas at the intake manifold 131. In one embodiment, each of the multiple flow paths of the intake manifold 131 includes a separate sensor 165.

In one embodiment, the gas engine assembly includes sensors 166 and 167 to detect characteristics of the exhaust gas output from the exhaust manifold 132 and turbine stage 122, respectively. In embodiments of the present invention, the transportation delay between the time that a gas supply mechanism is controlled until a time that a corresponding feature in the gas flow is received at the intake manifold 131, may be calculated based on detected data from one or more of the sensors 113, 161, 163, 165, 166 and 167. In one embodiment, the transportation delay is calculated based on data from two or more of the sensors 113, 161, 163, 165, 166 and 167. In one embodiment, the transportation delay is calculated based on analyzing data from two or more of the sensors 113, 161, 163, 165, 166 and 167 over time.

For example, in one embodiment, a gas supply control signal is transmitted to the mixer 114 to adjust a ratio of gas to air that is supplied to the first gas supply line 151. A change in a gas flow characteristic, such as a change in a pressure or temperature of the gas, is detected by the sensor 161, and a corresponding feature is detected in a data set provided by the sensor 161 to the engine control assembly 140. A change in a gas flow characteristic, such as a pressure or temperature, is also detected by the sensor 165, and a corresponding feature is detected in a data set provided by the sensor 165 to the engine control assembly 140. In one embodiment, features detected in the data sets from the sensors 161 and 165 have a non-linear relationship to the change in the ratio of air to gas, due at least in part to the bypass line 153 diverting at least a portion of the gas to bypass the compressor 121 (or to be fed back to the first gas supply line 151 from the second gas supply line 152). In one embodiment, the feed forward analysis unit 142 of the engine control assembly 140 analyzes a time at which the features corresponding to the changes in flow characteristics appear in the data sets from the sensors 161 and 165 and determines a transportation delay between a time that the mixer 114 changed settings to a time that a corresponding portion of the gas having a change in gas characteristics (such as a changed concentration of the gas) arrived at the intake manifold 131. The control signal generator 145 then adjusts or generates control signals to control valves or other gas supply control mechanisms taking into account the calculated transportation delay value.

Figure 3:
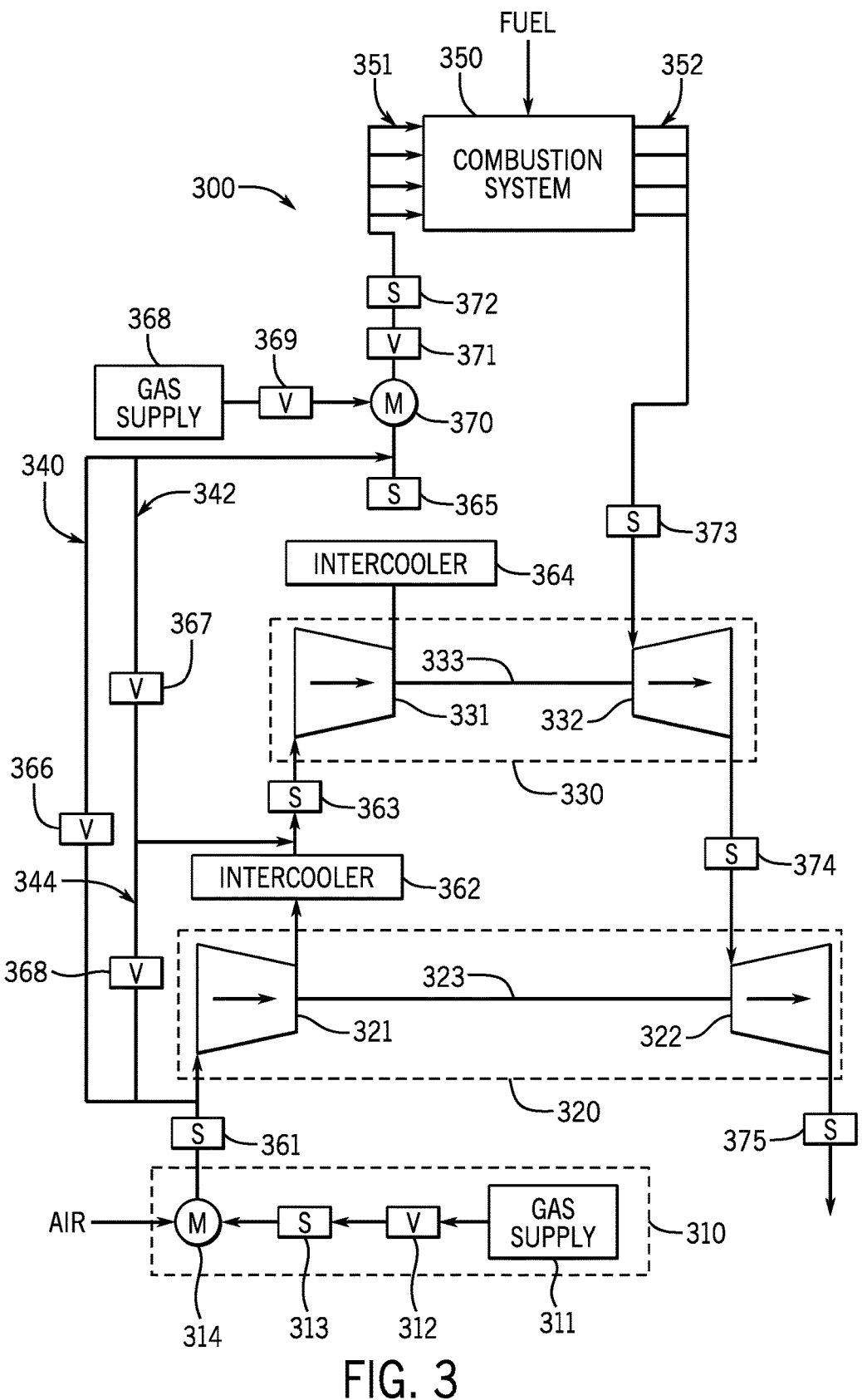
FIG. 3 illustrates a gas engine assembly according to another embodiment of the invention.

Although FIGS. 1 and 2 illustrate a single-stage gas turbine, embodiments of the present disclosure are not limited to a single stage, for example, FIG. 3 illustrates a two-stage gas engine assembly 300 according to an embodiment of the present invention.

The two-stage gas engine assembly 300 is similar to the gas turbine assemblies 100 and 200 of FIGS. 1 and 2, except the two-stage gas engine assembly 300 includes a low-pressure turbine structure 320 and a high-pressure turbine structure 330. Although only two turbine structures 320 and 330 are illustrated in FIG. 3, embodiments of the invention encompass any number of turbine structures.

The two-stage gas engine assembly 300 includes a gas supply system 310, a low-pressure turbine structure 320, a high-pressure turbine structure 330, and a combustion system 350. The gas supply system 310 includes a gas supply 311, a gas dosage valve (V) 312 a sensor (S) 313 and an air/gas mixer (M) 314. The gas supply 311, gas dosage valve (V) 312, sensor (S) 313 and air/gas mixer (M) 314 have been described previously with respect to the gas supply 111, gas dosage valve (V) 112, sensor (S) 113 and air/gas mixer (M) 114 of FIG. 2.

The gas (which may be a non-air gas, or a mixture of air and the non-air gas, or a gas/air mixture) output from the air/gas mixer 314 is supplied to the compressor 321 of the low-pressure turbine structure 320. The low-pressure turbine structure includes the compressor 321, a turbine stage 322 and a shaft 323 that is rotated based on a supply of gas to the turbine stage 322. In some circumstances, a portion of the gas from the air/gas mixer 314, less than all of the gas flow, is diverted through one or both of the bypass lines 340 and 344. The gas is supplied from the compressor 321 to an intercooler 362 to control a temperature of the gas, and the gas is transmitted to the compressor 331 of the high-pressure turbine structure 330. The high-pressure turbine structure 330 includes the compressor 331, a turbine stage 332 and a shaft 333 that is rotated based on a supply of gas to the turbine stage 332. In some circumstances, a portion of the gas from the compressor 321, less than all of the gas flow, is diverted through one or both of the bypass lines 342 and 344.

The gas is supplied from the compressor 331 to the intercooler 364 and to the mixer 370. The mixer 370 receives non-air gas from a gas supply 368, and the flow of the gas may be controlled by a gas supply control mechanism (V) 369. Although two mixers 370 and 314 are illustrated in FIG. 3, in one embodiment, only air is supplied to the first compressor 321, and the two-stage gas turbine 300 does not include the gas supply system 310. In such an embodiment, the mixer 370 is an air/gas mixer 370 configured to control a ratio of gas and air supplied to the intake manifold 351. In another embodiment in which two gas supplies 311 and 368 exist and two mixers 314 and 370 exist, the mixer 370 controls the addition of a same or different gas than the gas from the gas supply 311 to the air/gas mixture flowing to the combustion system 350.

A throttle valve 371 controls the flow of gas into the intake manifold 351, the heated and combusted gas flow out of the exhaust manifold 352 and to the turbine stages 332 and 322. Gas supply control mechanisms, also referred to as valves (V) 312, 366, 367, 368, 369 and 371 control the flow of gas and an air/gas mixture from the gas supplies 311 and 368 to the combustion system 350. The valves 312, 366, 367, 368, 369 and 371 are controlled by an engine control assembly, such as the engine control assembly 140 illustrated in FIG. 1, to control the flow of gas and an air/gas mixture. Sensors 313, 363, 363, 365, 372, 373, 374 and 375 measure characteristics of the gas and air/gas mixture in the two-stage gas engine assembly 300. The sensors 313, 363, 363, 365, 372, 373, 374 and 375 are similar to the sensors 113, 161, 163, 165, 166 and 167 of FIGS. 1 and 2, which have been described previously.

As discussed above with respect to FIGS. 1 and 2, measurement data from one or more of the sensors 313, 363, 363, 365, 372, 373, 374 and 375 is supplied to the engine control assembly 140 to calculate the transportation delay of the two-stage gas engine assembly 300. The engine control assembly 140 generates gas supply mechanism control signals taking into account the transportation delay to control the gas supply mechanisms 312, 366, 367, 368, 369 and 371.

Figure 4:
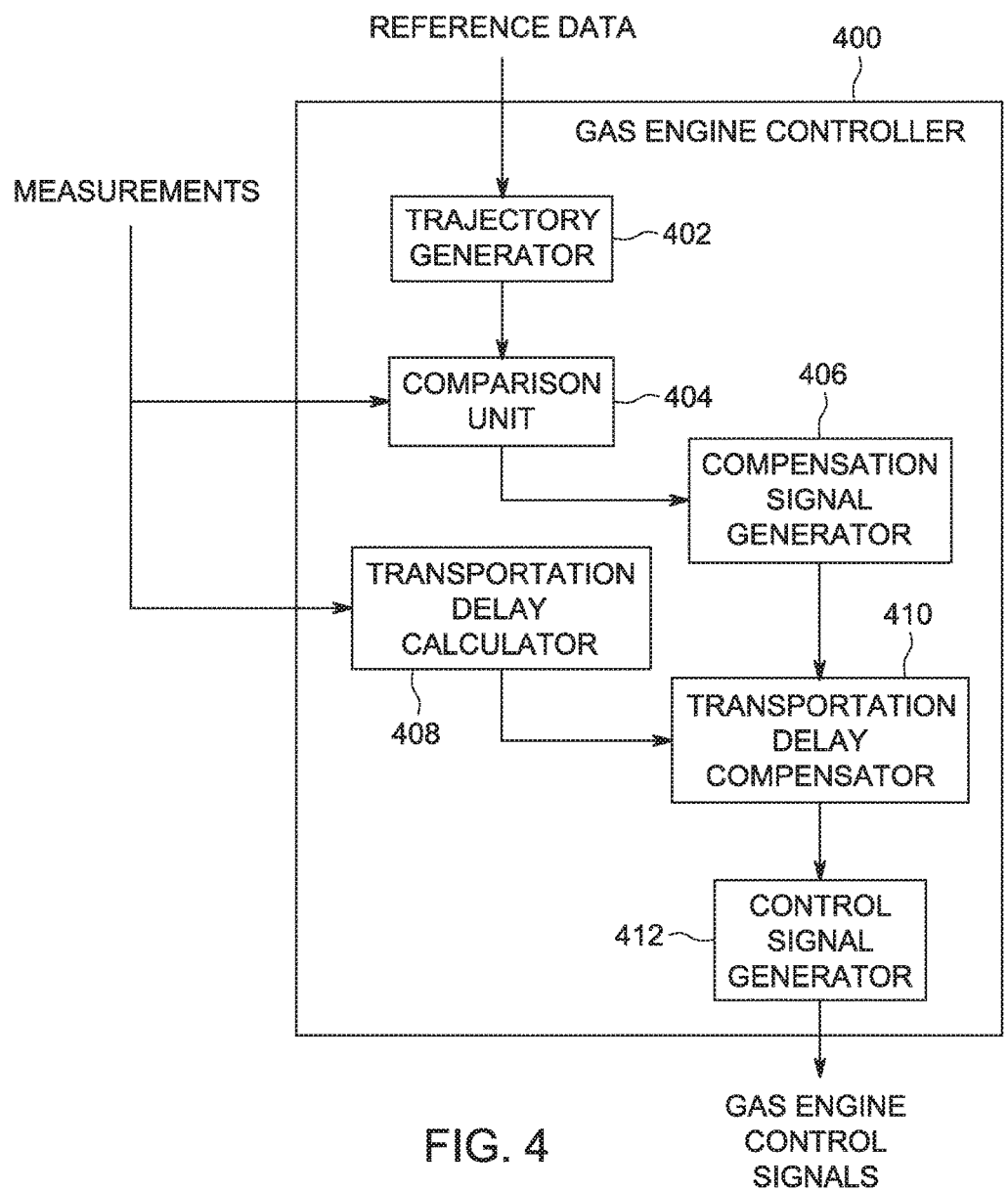
FIG. 4 is a block diagram of a gas engine controller according to one embodiment of the invention.

FIG. 4 illustrates a gas engine controller 400 according to an embodiment of the present invention. The gas engine controller 400 may correspond to the engine control assembly 140 of FIG. 1, for example. The gas engine controller 400 includes a trajectory generator 402, including one or both of hardware and software representing an algorithm to describe a transition between operating states of a gas engine assembly, such as the gas turbine assemblies 100, 200 and 300 of FIGS. 1-3. In other words, the trajectory generator 402 receives as input data reference data, from a user, stored in memory, from another control system or from any other source. The trajectory generator 402 determines the current state of the engine assembly and a target state. The trajectory generator 402 calculates a trajectory from the current state to the target state and outputs a target value corresponding to a point along the trajectory. Examples of target states of the gas engine assembly include any measureable parameter, such as output power levels, rotation speeds of a shaft or turbine stage, temperatures or pressures of a combustion system, fuel consumed, gas flow, or any other state of a gas engine assembly.

The gas engine controller 400 also includes a comparison unit 404 that receives as inputs measurements from sensors of the gas engine assembly and the target value from the trajectory generator 402. The comparison unit 404 generates an error value corresponding to a difference between presently measured data and the target value. The error value may be a number, a range of numbers, an equation defining a subset of values or any other value. The error value is output to a compensation signal generator 406 which generates a compensation signal to control gas supply mechanisms of the gas engine assembly based on the error value.

The gas engine controller 400 also includes a transportation delay calculator 408. The transportation delay calculator 408 may correspond to the feed forward analysis unit 142 of FIG. 1. The transportation delay calculator includes one or both of software and hardware configured to represent an algorithm that receives as inputs the measured sensor data and generates as outputs one or more values corresponding to a transportation delay of the gas engine assembly. The algorithm describes changes of gas concentration in manifolds along the gas supply path as a function of engine states. The engine states may correspond to combustion levels of the combustion system, rotation speed or torque levels of the turbine structure or any other engine states.

In one embodiment, the algorithm is a non-linear algorithm expressing the transportation delay between a gas supply mechanism and the intake manifold. The algorithm takes into account the diverting of a portion of gas, less than all of the gas, through a bypass line of the gas engine assembly having ends connected upstream and downstream from a compressor through which a gas stream flows.

The compensation signal and the transportation delay value are provided to a transportation delay compensator 410 to adjust the compensation signal based on the transportation delay signal. The adjusted compensation signal is output to a control signal generator 412 which generates one or more appropriate control signals to gas supply control mechanisms in the gas engine assembly to control the flow of gas or an air/gas mixture to a combustion system of the gas engine system.

In some embodiments, the trajectory generator 402, comparison unit 404, compensation signal generator 406, transportation delay calculator 408, transportation delay compensator 410 and control signal generator 412 are embodied in the same computer chip, microcontroller circuit, integrated circuit, circuit board or computer having a housing enclosing processing circuitry and memory. In other embodiments, one or more of the trajectory generator 402, comparison unit 404, compensation signal generator 406, transportation delay calculator 408, transportation delay compensator 410 and control signal generator 412 are embodied in a distributed manner among multiple computer chips, microcontroller circuits, integrated circuits, circuit boards or computers.

Figure 5:
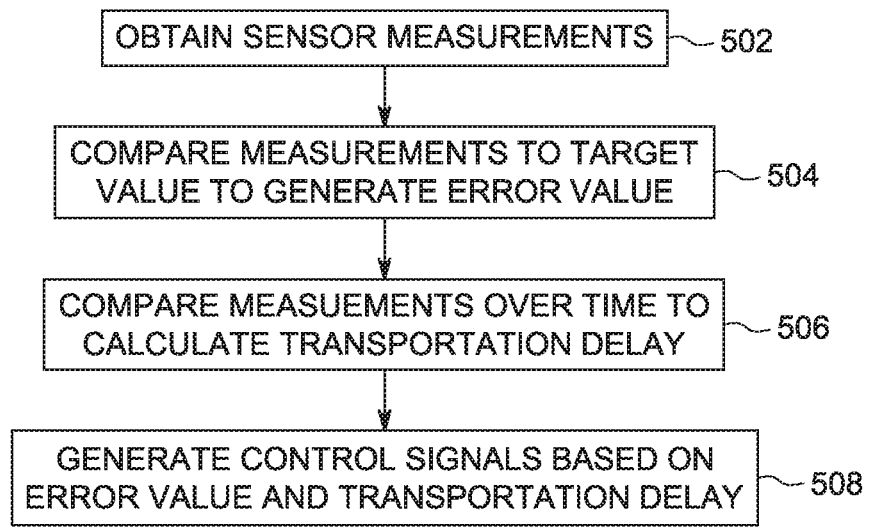
FIG. 5 is flow diagram of a method for controlling a gas engine according to one embodiment.

FIG. 5 illustrates a flow chart of a method of controlling a gas engine assembly according to one embodiment. In block 502, sensor measurements are obtained in the gas engine assembly. The sensor measurements may include pressure sensors, temperature sensors, engine speed sensors, and gas flow sensors. In one embodiment, the sensor measurements exclude one or both of a lambda sensor and an oxygen concentration sensor. The sensor measurements correspond to one or both of gas characteristics of a gas supply between a gas supply source and a combustion system and gas turbine characteristics, such as rotation speed. In some embodiments, the sensor measurements correspond to gas/air mixture characteristics of a gas/air mixture between the gas supply source and the combustion system.

In block 504, the measurements are compared to one or more target values to generate an error value. In one embodiment, the target value is calculated based on a trajectory corresponding to a present state of the gas engine assembly and a target state of the gas engine assembly. In such an embodiment, the target values correspond to points along the trajectory, and the error value corresponds to the difference between the presently-measured gas turbine characteristics and the target gas turbine characteristics.

In block 506, the measurements are analyzed over time to calculate a transportation delay. In one embodiment, the transportation delay is determined based on an algorithm that receives as inputs the measured sensor data and generates as outputs one or more values corresponding to a transportation delay of the gas engine assembly. The algorithm describes changes of gas concentration in manifolds along the gas supply path as a function of engine states. In some embodiments, the engine states correspond to combustion levels of the combustion system, rotation speed or torque levels of the turbine structure or any other engine states. In one embodiment, the algorithm is a non-linear algorithm expressing the transportation delay between a gas supply mechanism and the intake manifold. The algorithm takes into account the diverting of a portion of gas through a bypass line of the gas engine assembly having ends connected upstream and downstream from a compressor through which a gas stream flows.

In one embodiment, analysis of the measurements over time includes identifying in a first feature in a first set of measurements from a first sensor that corresponds to a gas supply control signal and identifying a second feature in a second set of measurements from a second sensor that corresponds to the same gas supply control signal. The transportation delay is then calculated based on a difference in time between the first and second features.

In block 508, control signals are generated to control one or more gas supply mechanisms based on the calculated error value and the transportation delay value.

Embodiments of the present invention control a gas engine assembly based on a transportation delay value that takes into account non-linear characteristics introduced, at least in part, by a bypass line along the gas supply path to the combustion system. Embodiments of the invention encompass systems including any type of sensors, such as pressure, temperature, engine speed and gas flow sensors, and in one embodiment, the system does not include lambda sensors or oxygen concentration sensors. Embodiments encompass single-stage and multi-stage turbine assemblies.

Embodiments of the invention encompass turbine assemblies, engine control systems, circuits, assemblies, programs and models, as well as other engine assemblies including gas supply lines provided to control a power output, and including bypass lines along the gas supply lines. Embodiments of the present invention also encompass, for example, methods for controlling turbine assemblies, calculating transportation delay values, generating gas supply control signals.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas engine assembly, comprising:
    a compressor configured to receive a gas from a first gas supply line and to compress the gas;
    a combustion system configured to receive the gas from the compressor via a second gas supply line and to combust the gas and a fuel;
    a bypass line having one end connected to the first gas supply line and an opposite end connected to the second gas supply line to divert a portion of the gas less than all of the gas from one of the first and second gas supply lines to the other of the first and second gas supply lines; and
    a control system configured to control gas supply parameters based on a transportation delay value, the transportation delay value corresponding to a delay between a time when a gas supply control mechanism is adjusted and a time that gas having a corresponding adjustment of a gas characteristic is received at a predetermined point downstream from the gas supply control mechanism, wherein the control system is configured to calculate the transportation delay value by determining a concentration of the gas along at least the second gas supply line over time.

2. The gas engine assembly of claim 1, wherein the gas supply control mechanism is a gas/air mixer, and
the gas is a mixture of air and a non-air gas.

3. The gas engine assembly of claim 1, wherein the gas supply control mechanism is a gas dosage valve configured to adjust an amount of a non-air gas provided to the first gas supply line.

4. The gas engine assembly of claim 1, wherein the bypass line is configured to transmit the portion of the gas from the first gas supply line to the second gas supply line within the gas engine assembly comprising a turbocharger.

5. The gas engine assembly of claim 1, wherein the control system is configured to calculate the concentration of the gas by measuring a pressure of the gas.

6. The gas engine assembly of claim 1, further comprising:
a first sensor along the first gas supply line; and
a second sensor along the second gas supply line,
wherein the control system is configured to calculate the transportation delay value based on analyzing measurements from the first and second sensors over time.

7. The gas engine assembly of claim 6, wherein analyzing the measurements from the first and second sensors over time includes detecting a first feature in the measurements from the first sensor corresponding to a first gas supply command signal, detecting a second feature in the measurements from the second sensor corresponding to the first gas supply command signal, and calculating the transportation delay value based on a difference in time between an occurrence of the first and second features, wherein the first feature and the second feature are indicative of the corresponding adjustment of the gas characteristic.

8. A gas engine control circuit, comprising:
a transportation delay calculation module configured to receive a measurement from at least one sensor along a gas supply path between a gas supply source and a combustion system and to calculate a transportation delay value corresponding to a delay between a time that a gas supply control mechanism is adjusted and a time that gas having a corresponding adjustment of a gas characteristic arrives at a predetermined point downstream from the gas supply control mechanism;
a gas supply mechanism control module configured to generate a gas supply control signal to control the gas supply control mechanism based on the transportation delay value;
a target value generator configured to generate a target value corresponding to a desired state of a gas turbine; and
a comparison unit configured to compare the target value with the measurement from the at least one sensor and to generate an error value based on a difference between the target value and the measurement,
wherein the gas supply mechanism control module is configured to generate the gas supply control signal to control the gas supply control mechanism based on the error value and the transportation delay value.

9. The gas engine control circuit of claim 8, wherein the transportation delay calculation module is configured to receive at least two sets of measurements over time from at least two sensors along the gas supply path and to calculate the transportation delay value based on an analysis of the at least two sets of measurements over time.

10. The gas engine control circuit of claim 8, wherein the transportation delay calculation module is configured to calculate the transportation delay value of the gas supply path of a gas turbine having a compressor configured to receive the gas from a gas supply source and to compress the gas, a combustion system configured to receive the gas from the compressor to combust the gas and a fuel, and a bypass line having one end connected along the gas supply path between the gas supply source and the compressor and an opposite end connected along the gas supply path between the compressor and the combustion system, and
the transportation delay calculation module is configured to calculate the transportation delay value by taking into account a diversion of a portion of the gas less than all of the gas through the bypass line.

11. A gas engine control circuit, comprising:
a transportation delay calculation module configured to receive a measurement from at least one sensor along a gas supply path between a gas supply source and a combustion system and to calculate a transportation delay value corresponding to a delay between a time that a gas supply control mechanism is adjusted and a time that gas having a corresponding adjustment of a gas characteristic arrives at a predetermined point downstream from the gas supply control mechanism; and
a gas supply mechanism control module configured to generate a gas supply control signal to control the gas supply control mechanism based on the transportation delay value, wherein the transportation delay calculation module is configured to receive at least two sets of measurements over time from at least two sensors along the gas supply path and to calculate the transportation delay value based on an analysis of the at least two sets of measurements over time.

12. The gas engine control circuit of claim 11, wherein the transportation delay calculation module is configured to detect a first feature in a first set of measurements from a first sensor among the at least two sensors, the first feature corresponding to a first gas supply control signal,
the transportation delay calculation module is configured to detect a second feature in a second set of measurements from a second sensor among the at least two sensors, the second feature corresponding to the first gas supply control signal, and
the transportation delay calculation module is configured to calculate the transportation delay value based on a difference in time between an occurrence of the first and second features.

13. The gas engine control circuit of claim 11, wherein the at least two sets of measurements are indicative of a pressure of gas in the gas supply path, a temperature of gas in the gas supply path, or a combination thereof.

14. The gas engine control circuit of claim 11, wherein the transportation delay calculation module is configured to calculate the transportation delay value of the gas supply path of a gas turbine having a compressor configured to receive the gas from a gas supply source and to compress the gas, the combustion system configured to receive the gas from the compressor to combust the gas and a fuel, and a bypass line having one end connected along the gas supply path between the gas supply source and the compressor and an opposite end connected along the gas supply path between the compressor and the combustion system, and the transportation delay calculation module is configured to calculate the transportation delay value by taking into account a diversion of a portion of the gas less than all of the gas through the bypass line.

15. The gas engine control circuit of claim 11, wherein the transportation calculation module is configured to calculate the transportation delay value by determining a concentration of the gas along the gas supply path over time based on the at least two sets of measurements.

16. The gas engine control circuit of claim 15, wherein the transportation calculation module is configured to determine the concentration of the gas by measuring a pressure of the gas with the at least one sensor.

17. A gas engine control circuit, comprising:
a transportation delay calculation module configured to receive a measurement from at least one sensor along a gas supply path between a gas supply source and a combustion system and to calculate a transportation delay value corresponding to a delay between a time that a gas supply control mechanism is adjusted and a time that gas having a corresponding adjustment of a gas characteristic arrives at a predetermined point downstream from the gas supply control mechanism; and
a gas supply mechanism control module configured to generate a gas supply control signal to control the gas supply control mechanism based on the transportation delay value, wherein the transportation delay calculation module is configured to calculate the transportation delay value by taking into account a diversion of a portion of the gas less than all of the gas through a bypass line having one end connected along the gas supply path between the gas supply source and a compressor and an opposite end connected along the gas supply path between the compressor and the combustion system, and the transportation delay calculation module is configured to calculate the transportation delay value of the gas supply path of a gas turbine having the compressor configured to receive the gas from a gas supply source and to compress the gas, and the combustion system configured to receive the gas from the compressor to combust a fuel and the gas contained in the bypass line.

18. The gas engine control circuit of claim 17, wherein the transportation calculation module is configured to calculate the transportation delay value by determining a concentration of the gas along the gas supply path over time.

19. The gas engine control circuit of claim 18, wherein the transportation calculation module is configured to calculate the concentration of the gas by measuring a pressure of the gas.

* * * * *